June 26, 1928.  1,675,032

J. LAMONT

ANTISPLASH DEVICE FOR THE WHEELS OF ROAD VEHICLES

Filed Oct. 25, 1926

INVENTOR:
John Lamont
BY: Reep, Bayer & Bakeler
ATTORNEYS.

Patented June 26, 1928.

1,675,032

UNITED STATES PATENT OFFICE.

JOHN LAMONT, OF EDINBURGH, SCOTLAND.

ANTISPLASH DEVICE FOR THE WHEELS OF ROAD VEHICLES.

Application filed October 25, 1926, Serial No. 143,909, and in Great Britain April 6, 1926.

My invention relates to means for preventing the objectionable splashing of mud or other foreign matter in connection with the wheels of road vehicles, and has for its object to provide an improved anti-splash device which automatically comes into operation when the wheels of the vehicle are revolving or turning.

In carrying out my invention the device consists of a casing preferably mounted on ball-bearings on the hub, or an extension of the hub, and said casing is weighted at one or more points of its periphery so that it will not turn with the wheel. Within the casing are arranged one or more fans, preferably two, each fan being provided with a pinion which gears with a spurwheel turning with the wheel.

A portion of the lower part of the periphery of the casing is removed and the openings, so formed, is provided with a deflecting plate.

In order that my said invention and the manner of performing the same may be properly understood I hereunto append a sheet of explanatory drawings to be hereinafter referred to in describing my invention.

Figure 1:
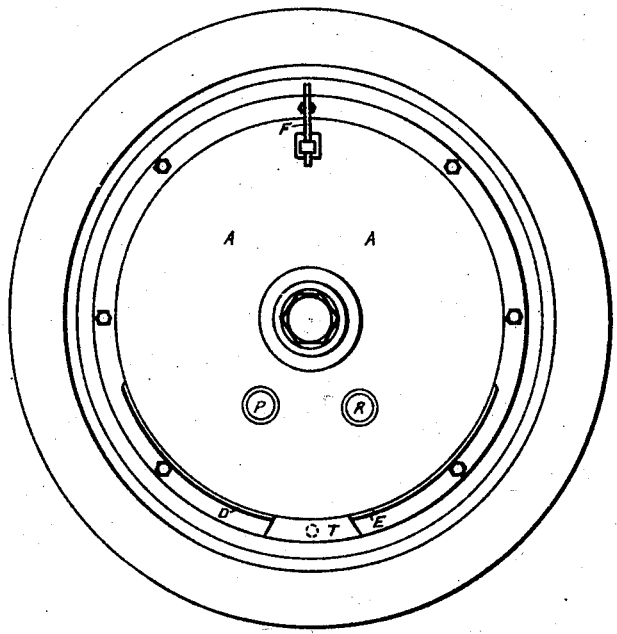
Figure 3:
Figure 2:
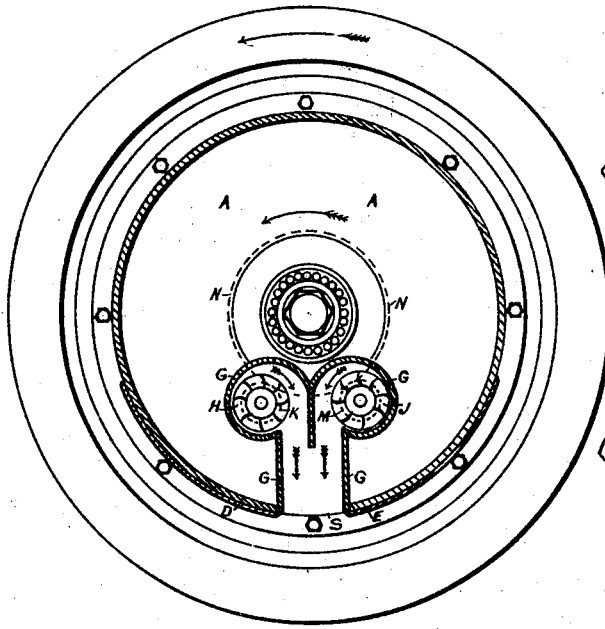
Figure 4:
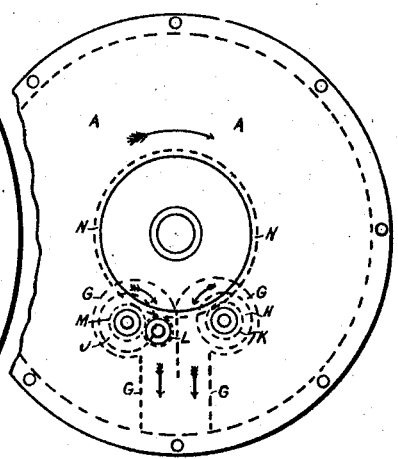

Figure 1 is a side elevation of a wheel provided with the improved anti-splash device. Figure 2 is a sectional side elevation. Figure 3 is an end elevation, and Figure 4 is a back elevation of the casing showing the drive for the fans. In these drawings the same reference letters are used to mark the same or like parts wherever they are repeated.

As shown in Figure 2 of the drawings, the device consists of a casing A, mounted on ball bearings B, on the hub C, said casing being provided with weights D, and E, on its periphery so that it will not turn with the wheel, and to further assist in preventing the casing turning a stay F, may be attached to it and to the mudguard or other stationary part of the vehicle. Within the casing A, is a second casing G, in which are arranged two fans H, and J, driven in opposite directions through small toothed wheels K, L, and M, gearing with a large toothed wheel N, the latter rotating with the wheel. Air inlet ports P, and R, are formed in the front of the casing A.

A portion of the lower part of the periphery of the casing A, is removed, and the opening S, thus formed, is provided with a deflecting plate T.

Two fans are shown, but it is to be understood that one, or more than two fans may be employed.

In operation the action of the improved anti-splash device is as follows:—When the wheel revolves it, through the large toothed wheel N, and small toothed wheels K, L, and M, drives the fans H, and J, in opposite directions to each other, and the air current thus induced is forced downwards against the deflecting plate T, at the lower part of the periphery of the wheel, thus automatically counteracting the splashing action of the latter. The device can be simply and economically constructed, and expeditiously removed, and replaced, as desired, its action is automatic and it ceases to function immediately that the wheel ceases to revolve. Further, it is clear of all obstacles on the road, and allows of the wheel coming close to the curb.

What I claim is:—

An anti-splash device for the wheels of road vehicles, comprising a non-rotatable casing disposed adjacent to each wheel, a pair of fans mounted for rotation in said casing, each of said fans being enclosed in a separate fan casing, gearing between the wheel and said fans for rotating the latter in opposite directions one to the other, said first casing being provided with an air inlet port for each fan casing and a common outlet port for both of said casings, and means for directing the air from said outlet port toward the periphery of the wheel.

In testimony whereof I have signed my name to this specification.

JOHN LAMONT.